INVENTOR
MILES SKRIVANEK, JR.
BY
ATTORNEY

United States Patent Office 3,488,756
Patented Jan. 6, 1970

3,488,756
SPEED CONTROL SYSTEM FOR A LOW
INERTIA D.C. MOTOR
Miles Skrivanek, Jr., Glenwood Landing, N.Y., assignor to Potter Instrument Company, Inc., Plainview, N.Y., a corporation of New York
Filed Jan. 9, 1967, Ser. No. 607,958
Int. Cl. H02p 5/06
U.S. Cl. 318—331      5 Claims

ABSTRACT OF THE DISCLOSURE

The specification and drawings disclose a system for maintaining constant the speed of a low inertia motor, particularly a low inertia motor running at a relatively low speed. At running speed, the motor is energized by short pulses fixed in magnitude and after each pulse the back E.M.F. of the motor is sampled. With the motor coasting, the back E.M.F. drops; when it reaches a certain level, another energizing pulse is applied, bringing the motor back up to speed. Extremely rapid response is required for good control in a low inertia system. To achieve this response, the back E.M.F. of the motor is sampled only after the termination of an energizing pulse in order to avoid saturating the sampling circuits.

---

The speed of a D.C. motor having a low inertia armature is controlled by periodically applying to the armature pulses of fixed duration, and sampling the back electromotive force generated by the armature (which is a function of the armature speed) during intervals when no energizing pulse is applied.

This invention relates to a system for controlling the speed of a motor and, more particularly, to a novel system for controlling the speed of a low inertia direct current motor.

As one example, low inertia direct current (D.C.) motors are advantageously employed in the prior art as capstan drive motors in certain magnetic tape transports. Such motors may be coupled directly to the capstan, which continuously engages the magnetic tape, and the motion of the tape may be controlled by controlling the rotation of the motor. As will be appreciated by those skilled in the art, the combined inertia of the motor armature and capstan is necessarily small so that the tape can be accelerated to operating speed and stopped quickly.

In this and other similar applications for such motors, speed control systems employing a tachometer have been proposed. Such tachometers are expensive and difficult to maintain in satisfactory operating condition. Such prior art systems are not, therefore, entirely satisfactory.

One object of this invention is the provision of a system for controlling the speed of a low inertia D.C. motor which is less expensive than prior art systems of comparable efficaciousness.

Another object of this invention is the provision of an electronic speed control system for a low inertia D.C. motor which is reliable and requires little or no maintenance.

A further object of the invention is to provide a speed control system for a low inertia D.C. motor in which the back electromotive force (back E.M.F.) of the motor is utilized as a measure of motor speed, thereby eliminating the need for a tachometer or other similar device.

Briefly, this invention contemplates the provision of a speed control system in which the motor is energized by pulses of a predetermined magnitude and duration which are separated by intervals during which no power is applied to the motor. During these so-called no-power intervals, the motor coasts, and a comparator circuit compares back E.M.F. of the armature, the magnitude of which is a function of the motor speed, with a reference potential. When the motor decelerates slightly below a desired speed, its back E.M.F. drops below the reference potential. Another energizing pulse is applied to the motor, which accelerates it to a speed slightly above the desired speed. In this fashion, the speed of the motor, although fluctuating about the desired speed, is maintained within a small percentage of this speed.

Importantly, during the application of energizing pulses to the motor, the input to the comparator is clamped to a potential which is approximately equal to the back E.M.F. of the motor at the desired speed. Thusly, the comparison circuits are not so overloaded that they require a long recovery period and the back E.M.F. of the motor may be compared to the reference potential shortly after the termination of an energizing pulse.

Having briefly described this invention, it will be described in greater detail along with other objects and advantages in the following detailed description of a preferred embodiment which may be best understood by reference in the accompanying drawings which form part of the instant specification and which are to be read in conjunction therewith and which like reference numerals are used to indicate like parts in the various views;

FIGURE 2a shows the armature speed;

FIGURE 2b shows the potential across the motor armature, including the motor back E.M.F.;

FIGURE 2c shows the potential at the input to the comparator;

FIGURE 2d shows the output of multivibrator 34; and

FIGURE 2e shows the output of multivibrator 42.

Figure 1:
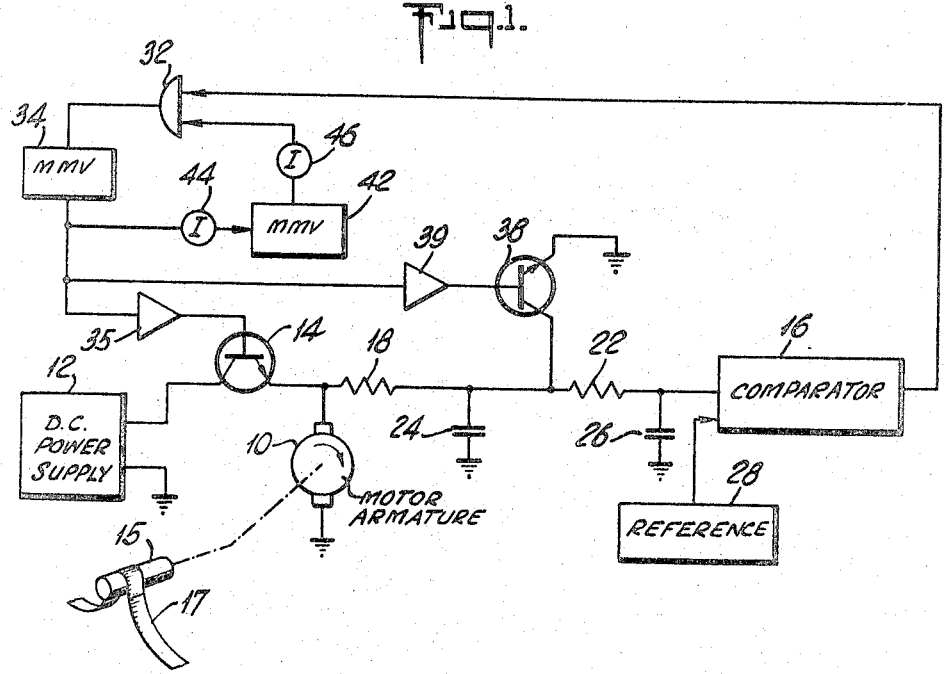
FIGURE 1 is a schematic drawing of one embodiment of a motor speed control circuit of this invention.

Referring now to FIGURE 1 of the drawings, the armature 10 of a low inertia D.C. motor such as a so-called printed circuit motor for example, is coupled to a D.C. power supply 12 by means of a transistor switch 14. Advantageously, the armature 10 may be coupled directly to a capstan 15 which drives a magnetic tape 17. The motor armature 10 is also coupled via a low pass filter comprising resistors 18 and 22 and capacitors 24 and 26 as one input to a comparator circuit 16 which may comprise a differential amplifier, for example. This low pass filter eliminates various noise signals generated by the coasting armature from the comparator input. The other input to comparator 16 is a D.C. reference potential source 28 whose output potential is advantageously slightly less than the back E.M.F. of motor 10 at its desired speed.

When the back E.M.F. generated by armature 10 drops below reference potential 28, comparator 16 produces an output signal which is coupled via an input AND gate 32 as a trigger signal to a monostable multivibrator (M.M.V.) 34. When triggered, M.M.V. 34 switches to its unstable state for a predetermined interval and produces an output signal which is coupled via an amplifier 35 to the base of transistor 14 driving it to saturation. During the interval while transistor 14 is saturated, the power supply 12 energizes motor armature 10, causing the armature to rotate in a clockwise direction, for example.

During this energizing interval, a transistor switch 38, whose base is coupled to the output of M.M.V. 34 via an amplifier 39, clamps the input to comparator 16 to a reference potential such as a ground. The value of this reference potential is advantageously within a few volts of the back E.M.F. generated by the armature 10 at its desired speed. It should be noted that this clamp circuit reduces the time required for the system to stabilize following energization of the motor 10. In the absence of the clamp circuit, the input to the comparator would have to decay exponentially from the relatively high motor energizing potential, and this decay would require an appreciable time interval owing to the filter which couples the motor armature to the comparator 16, which necessarily has a relatively long time constant.

AND gate 32 ensures that spurious inputs to comparator 16 from motor 10 do not trigger M.M.V. 34 prior to stabilization of the system. It will be appreciated that the back E.M.F. of the motor should be sampled only when the current flow through its armature is practically zero owing to the fact that any IR voltage drop through the armature would mask the back E.M.F. The enabling input to gate 32 is from the output of a second multivibrator 42 which is coupled to multivibrator 34 via an inverter 44 and is triggered at the trailing edge of the output pulse from multivibrator 34. Inverter 46 inverts the output 42; an output from comparator 16, therefore, cannot trigger multivibrator 34 until a predetermined interval (recovery period in FIGURE 2) following energization of the motor armature 10.

Figure 2:
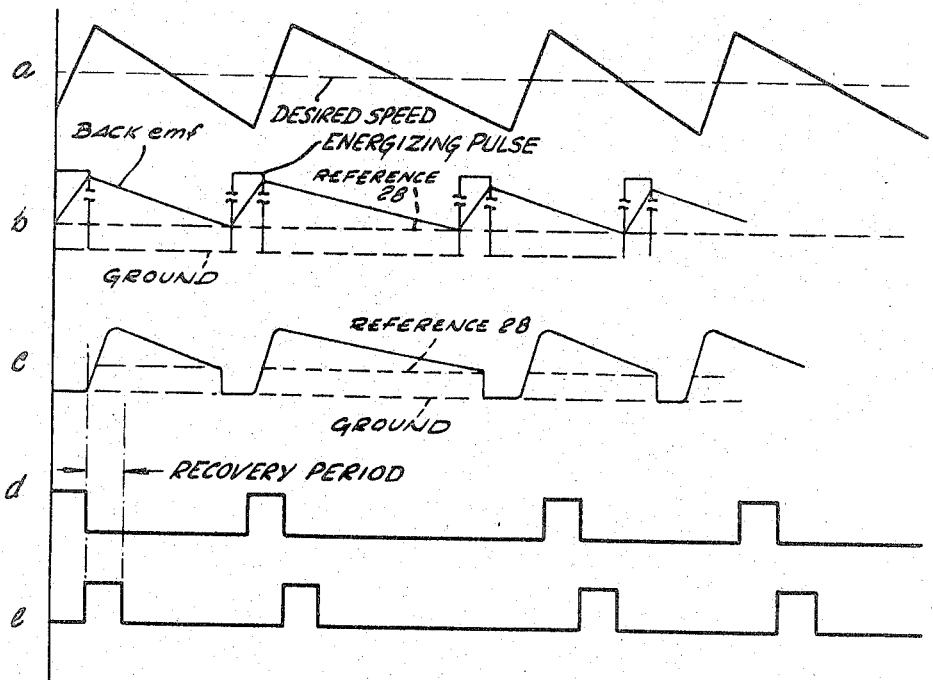
FIGURE 2 is a timing diagram showing idealized waveforms for various locations of the circuit of FIGURE 1.

Referring now to FIGURE 2 in addition to FIGURE 1, in operation, an applied energizing pulse accelerates the armature 10 to a speed which exceeds the desired speed by about one-half of one percent of the desired speed. After the energizing pulse terminates, the motor coasts; as the speed of the armature falls, the input to the comparator 16 becomes less positive (in the illustrative embodiment of FIGURES 1 and 2). When the armature speed is about one-half of one percent below the desired speed, the input to comparator 16 reaches the potential of reference 28, and an output from the comparator 16 triggers the multivibrator 34. The amplified output of multivibrator 34 saturates transistor 14, thereby coupling the power supply 12 across the armature 10. During this energizing interval, transistor 38 is also saturated, clamping the input to comparator 16 at ground potential.

When multivibrator 34 switches back to its stable state, transistors 14 and 38 come out of saturation and multivibrator 42 is triggered. Multivibrator 42 produces an output pulse of predetermined duration which, owing to inverter 46, disables gate 32 and thereby prevents triggering of multivibrator 34 during the recovery period.

The power supply is thereby decoupled from the motor armature and the input to comparator 16 is no longer clamped to ground potential; its input initially rises to a positive potential which equals the back E.M.F. of the armature 10 at approximate rated speed. The back E.M.F. thereafter gradually falls as the motor decelerates, until it reaches the potential of reference 28 and multivibrator 34 is again triggered.

Thus, it will be appreciated that the objects of the invention have been accomplished. There is herein disclosed a system for controlling the speed of a low inertia D.C. motor which does not require the use of a tachometer or other expensive speed sensing apparatus.

What is claimed is:
1. A system for maintaining constant the speed of a D.C. motor comprising, in combination:
   a motor having a low inertia armature,
   a low inertia load coupled to said armature,
   means responsive to a signal for energizing said motor for a predetermined interval,
   means responsive to the back E.M.F. generated by the armature reaching a certain level for generating said signal,
   said back E.M.F. responsive means including a reference potential and a comparator circuit having two input means and an output means,
   means for coupling said reference potential to one of said comparator input means,
   means including a low pass filter for coupling said armature to the other comparator input means, and
   means for decoupling said other comparator input from said armature during said predetermined interval when said armature is energized and for clamping it to a certain potential during said predetermined interval when said motor is energized.

2. A system for maintaining constant the speed of a D.C. motor as in claim 1 wherein said back E.M.F. responsive means includes a D.C. amplifier.

3. A system for maintaining constant the speed of a D.C. motor as in claim 1 further including means for blocking said signal for a recovery interval following said predetermined interval.

4. A system for maintaining constant the speed of a D.C. motor as in claim 1 wherein said reference potential is approximately equal to said certain back E.M.F. of the motor.

5. A system for maintaining constant the speed of a D.C. motor as in claim 4 wherein said clamping means includes a semi-conductor switch and provides a low impedance path to said certain potential.

References Cited

UNITED STATES PATENTS

| 3,027,505 | 3/1962 | Auld | 318—345 X |
| 3,231,808 | 1/1966 | McDaniel | 318—331 |
| 3,249,840 | 5/1966 | Eriksson et al. | 318—331 |
| 3,354,371 | 11/1967 | Ainsworth et al. | 318—341 |

ORIS L. RADER, Primary Examiner

ROBERT J. HICKEY, Assistant Examiner

U.S. Cl. X.R.

318—345